United States Patent
Ghanim

(10) Patent No.: US 12,503,384 B1
(45) Date of Patent: Dec. 23, 2025

(54) AUTOMATED SWIMMING POOL CHEMICAL DISPENSING SYSTEM WITH SPIN-DOWN SEDIMENT FILTER TO CONTROL THE SWIMMING POOL CHEMISTRY

(71) Applicant: Yaamr Ghanim, Garland, TX (US)

(72) Inventor: Yaamr Ghanim, Garland, TX (US)

( * ) Notice: Subject to any disclaimer, the term of this patent is extended or adjusted under 35 U.S.C. 154(b) by 323 days.

(21) Appl. No.: 18/381,572

(22) Filed: Oct. 18, 2023

Related U.S. Application Data

(60) Provisional application No. 63/418,191, filed on Oct. 21, 2022.

(51) Int. Cl.
| | |
|---|---|
| *C02F 9/00* | (2023.01) |
| *C02F 1/00* | (2023.01) |
| *C02F 1/66* | (2023.01) |
| *C02F 1/68* | (2023.01) |
| *C02F 103/42* | (2006.01) |

(52) U.S. Cl.
CPC ............... *C02F 9/00* (2013.01); *C02F 1/008* (2013.01); *C02F 1/001* (2013.01); *C02F 1/66* (2013.01); *C02F 1/687* (2013.01); *C02F 2103/42* (2013.01); *C02F 2201/005* (2013.01); *C02F 2209/04* (2013.01); *C02F 2209/06* (2013.01)

(58) Field of Classification Search
CPC .. C02F 9/00; C02F 1/008; C02F 1/001; C02F 1/66; C02F 1/687; C02F 2103/42; C02F 2201/005; C02F 2209/04; C02F 2209/06
USPC .......................................................... 210/143
See application file for complete search history.

(56) References Cited

U.S. PATENT DOCUMENTS

| | | | |
|---|---|---|---|
| 9,227,860 B1* | 1/2016 | King ................... | C02F 1/685 |
| 2003/0019800 A1* | 1/2003 | Romanyszyn ......... | B01D 36/02 |
| | | | 210/90 |

* cited by examiner

*Primary Examiner* — Ekandra S. Miller-Cruz
(74) *Attorney, Agent, or Firm* — Plager Schack LLP; Mark H. Plager; Stephen Hallberg

(57) ABSTRACT

An automated swimming pool chemical dispensing system is disclosed. The automated swimming pool chemical dispensing system operates with a spin-down sediment filter to control the swimming pool chemistry.

7 Claims, 4 Drawing Sheets

AUTOMATED SWIMMING POOL CHEMICAL DISPENSING SYSTEM WITH SPIN-DOWN SEDIMENT FILTER TO CONTROL THE SWIMMING POOL CHEMISTRY

CLAIM OF BENEFIT TO PRIOR APPLICATION

This application claims benefit to U.S. Provisional Patent Application 63/418,191, entitled "Automated dispensing system to manage the swimming pool chemistry," filed Oct. 21, 2022. The U.S. Provisional Patent Application 63/418,191 is incorporated herein by reference.

BACKGROUND

Embodiments of the invention described in this specification relate generally to swimming pool automation dispensing systems, and more particularly, to an automated swimming pool chemical dispensing system with spin-down sediment filter to control the swimming pool chemistry.

Existing swimming pool automation dispensing systems fail to consistently and constantly control pool chemistry at the appropriate level. The existing swimming pool automation dispensing systems typically measure oxidation/reduction potential (ORP, also referred to as redox potential) and/or PH balance to determine whether or not to dispense chlorine. However, most of the existing swimming pool automation dispensing systems are hampered by several issues including, without limitation, (i) common fluctuations in ORP/pH readings and failures in maintaining pool chemistry at the required set level, (ii) high need for frequent cleaning and calibration (e.g., every fourth day at maximum is the most typical scenario for the existing systems), (iii) releasing undissolved chlorine particulate matter into the pool based on common usage of slow chlorine dissolve feeders (using CCH tablets) which is a permanent issue due to their delivery of a lot of undissolved and visible particles of chlorine into the swimming pool (which, among other problems, leads to a lot of chlorine waste), and (iv) frequent and abundant need for maintenance for the many swimming pool automation dispensing systems which are deployed with large and heavy stands, complicated electronics and machinery with more parts.

Beyond these common issues facing the existing swimming pool automation dispensing systems available in the market, one of the more dominant swimming pool automation dispensing systems currently in the market is the Ecolab system. The Ecolab system has many, if not all, of the issues that hobble all the other swimming pool automation dispensing systems, noted above.

Therefore, what is needed is a way to consistently and accurately control swimming pool chemistry in a way that dispenses dissolved chlorine free of undissolved particles.

BRIEF DESCRIPTION

A novel automated swimming pool chemical dispensing system is disclosed. In some embodiments, the automated swimming pool chemical dispensing system operates with a spin-down sediment filter to control the swimming pool chemistry.

In some embodiments, the automated swimming pool chemical dispensing system comprises a chemical controller, a chlorine feeder, a spin-down filter, a zero differential solenoid valve (normally closed), a normally open solenoid valve, a clear sediment filter, a waterproof cable connector, and an acid pump. In some embodiments, the spin-down filter is installed in an upside-down orientation. In some embodiments, the spin-down filter comprises a chemical resistant sediment screen T-style spin-down filter.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
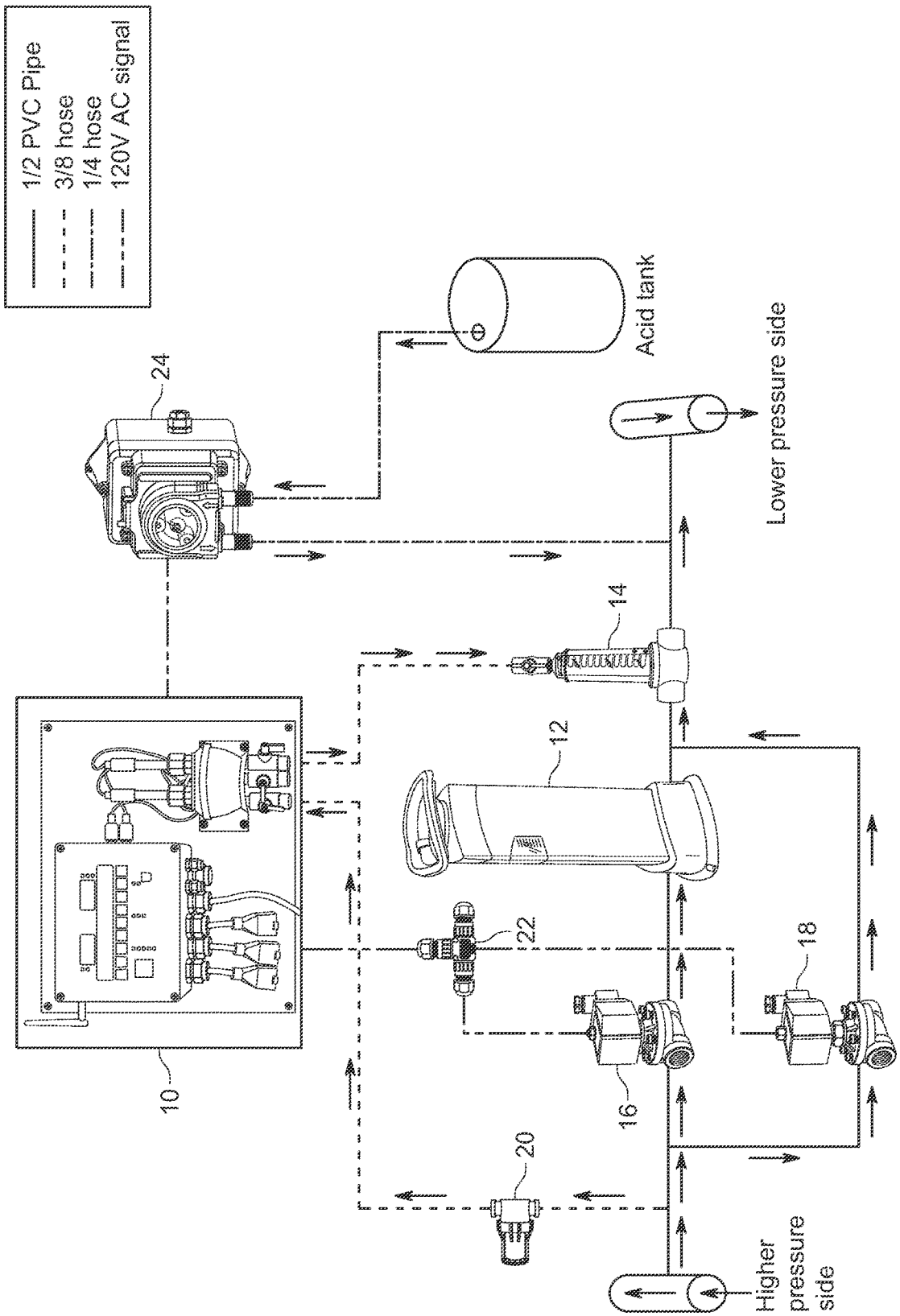
FIG. 1 conceptually illustrates a schematic view of an automated swimming pool chemical dispensing system with a spin-down sediment filter to control swimming pool chemistry in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention described in this specification include an automated swimming pool chemical dispensing system with a spin-down sediment filter to control the swimming pool chemistry.

In some embodiments, the automated swimming pool chemical dispensing system comprises a chemical controller, a chlorine feeder, a spin-down filter, a zero differential solenoid valve (normally closed), a normally open solenoid valve, a clear sediment filter, a waterproof cable connector, and an acid pump. In some embodiments, the spin-down filter is installed in an upside-down orientation. In some embodiments, the spin-down filter comprises a chemical resistant sediment screen T-style spin-down filter.

As stated above, existing swimming pool automation dispensing systems, including the Ecolab system, fail to consistently and constantly control pool chemistry at the appropriate level. The existing swimming pool automation dispensing systems typically measure ORP and pH to determine whether or not to dispense chlorine. However, most of the existing swimming pool automation dispensing systems are hampered by several issues including, without limitation, (i) common fluctuations in ORP/pH readings and failures in maintaining pool chemistry at the required set level, (ii) high need for frequent cleaning and calibration (e.g., every fourth day at maximum is the most typical scenario for the existing systems), (iii) releasing undissolved chlorine particulate matter into the pool based on common usage of slow chlorine dissolve feeders (using CCH tablets) which is a permanent issue due to their delivery of a lot of undissolved and visible particles of chlorine into the swimming pool (which, among other problems, leads to a lot of chlorine waste), and (iv) frequent and abundant need for maintenance for the many swimming pool automation dispensing systems which are deployed with large and heavy stands, complicated electronics and machinery with more parts. Embodiments of the automated swimming pool chemical dispensing system described in this specification solve such problems by way of a box controller (pH and ORP controller) that provides accurate pH and ORP readings and is highly stable, with no need for sensor calibration over a lengthy span of time (e.g., more than four months). Also, the selected chlorine feeder of the system has been modified to feed chlorine (i.e., CCH chlorine tablets) without putting chlorine residuals (that is, undissolved and visible particles) inside the pool. Furthermore, a combination of the box controller and the chlorine feeder (with their associated parts) are assembled together on one small stand, thereby making the system easy to move and install. Overall, the automated swimming pool chemical dispensing system is straightforward (not as complicated as the existing systems) with less expensive components. For instance, the automated swimming pool chemical dispensing system is installed with ease by connection of merely two tubes to the swimming pool filtration plumbing system.

Embodiments of the automated swimming pool chemical dispensing system described in this specification differ from and improve upon currently existing options. In particular, one key improvement provided by the automated swimming pool chemical dispensing system is the ability to ensure that chlorine is released into the swimming pool when it is fully dissolved, not by a slow dissolve chlorine feeder that sends undissolved and visible chlorine particles inside the swimming pool. In particular, the automated swimming pool chemical dispensing system provides this improvement by installing a sediment filter in a novel upside-down orientation, where the selected filter has a spin-down water flow technique at the outlet of the feeder to prevent the undissolved particles of the chlorine from being released into the main pool. In some embodiments, the sediment filter is selected based on mesh filter size. In some embodiments, the selected sediment filter comprises a 24 mesh filter size. A 24 mesh filter size is equivalent to approximately 700 microns.

Another novel improvement provided by the automated swimming pool chemical dispensing system is its ability to break up and dissolve big chlorine particles. Specifically, the automated swimming pool chemical dispensing system supplies a first continuous washing water line into the sediment filter to mechanically wash, break apart, and dissolve the big particles inside the sediment filter. In some embodiments, the automated swimming pool chemical dispensing system does this by spinning the particles up around the filter. In this way, the automated swimming pool chemical dispensing system can help to save more chlorine for use, rather than washing these particles away down in the sewer. In addition to the first continuous washing water line, the automated swimming pool chemical dispensing system of the present disclosure supplies a second continuous water line from the main cell of the pH and ORP sensor to provide more wash from the top of the sediment filter.

Another novelty of the automated swimming pool chemical dispensing system is provided by a water line that bypasses the solenoid to provide a slow dissolve mechanism. Specifically, the automated swimming pool chemical dispensing system provides a third water line in the form of a ⅜" hose as a continuous water line which bypasses the main solenoid valve to provide a slow dissolve by flow through the chlorine tablets. By catching undissolved chlorine particles, the automated swimming pool chemical dispensing system is able to save owners money and effectively dissolve the chlorine tablets almost entirely, with almost zero particulate chlorine released into the pool area (that is, only particulates smaller than the 700 micron filter).

The automated swimming pool chemical dispensing system of the present disclosure may be comprised of the following components: (i) a controller, (ii) a chlorine feeder, (iii) a sediment filter, and (iv) an acid pump. This list of possible constituent components is intended to be exemplary only and it is not intended that this list be used to limit the automated swimming pool chemical dispensing system of the present application to just these components. Persons having ordinary skill in the art relevant to the present disclosure may understand there to be equivalent components that may be substituted within the present disclosure without changing the essential function or operation of the automated swimming pool chemical dispensing system.

In particular, the components of the automated swimming pool chemical dispensing system may be comprising of the following more specific components.
1. IPS M920W as the (i) controller
2. CCH Endurance Feeder as the (ii) chlorine feeder
3. Vu-Flow Chemical Resistant Sand (sediment) Separator Filter T-Style 1½ inch spin down
4. ½ inch Plastic Zero Differential Electric Water Solenoid Valve (NC)
5. ½ inch Normally Open (NO) Plastic Electric Water Solenoid Valve
6. ½ Shuangtong Clear Sediment Filter as the (iii) sediment filter
7. IP68 Waterproof Cable Connector 3-Channel (¼ inch hose)
8. E20FXBAIS6 STENNER ACID PUMP FIXED as the (iv) acid pump (to feed muriatic acid from acid tank to the pool water to lower the pH level to a set point)

By way of example, FIG. 1 conceptually illustrates a schematic view of an automated swimming pool chemical dispensing system with a spin-down sediment filter to control swimming pool chemistry in some embodiments. As shown in this figure, the automated swimming pool chemical dispensing system with the spin-down sediment filter to control swimming pool chemistry includes several components including a chemical controller 10, a chlorine feeder 12, a chemical resistant sediment screen T-style filter 14, a zero differential solenoid valve 16, a normally open solenoid valve 18, a clear sediment filter 20, a waterproof cable connector 22, and an acid pump 24. In some embodiments, the controller 10 is an IPS 920W controller. In some embodiments, the chlorine feeder 12 is an Endurance feeder.

In some embodiments, the chemical resistant sediment screen T-style filter 14 is the spin-down filter and is oriented upside-down. In some embodiments, the waterproof cable connector 22 is a ¼ inch hose that connects the chemical controller 10 to the zero differential solenoid valve 16, which is normally closed, and the normally open solenoid valve 18. In this way, the chemical controller 10 is able to transmit electrical signals to the valves 16 and 18, to open and close them as needed.

As shown in this figure, the automated swimming pool chemical dispensing system generally works by the chemical controller 10 reading and adding the right amount of chlorine using items the zero differential solenoid valve 16 (normally closed) and the acid pump 24. The chemical controller 10 is designed to work with the batch system which means it has feed time and delay time (stop time). When the ORP reading of the pool water (that is read by the chemical controller 10) goes below a set point, the chemical controller 10 will send an electrical 120V signal with a certain feed time duration to open the normally closed zero differential solenoid valve 16 and close the normally open solenoid valve 18 to enter the water stream to the chlorine feeder 12 to run the pool water through the chlorine tablets and get some dissolved and undissolved chlorine within the water stream. After the feed time duration is done, the chemical controller 10 stops the 120V signal. This triggers the normally closed zero differential solenoid valve 16 to close and the normally open solenoid valve 18 to re-open to send most of the water to wash the undissolved chlorine particles inside the chemical resistant sediment screen T-style filter 14. By installing the spin-down sediment filter in an upside-down orientation, the chemical resistant sediment screen T-style filter 14 will result in the undissolved chlorine particles falling as sediment to the bottom to be spun up by the water flow and breaking up on a continuous basis. Also, there is another small water stream to serve as a bypass on the chemical resistant sediment screen T-style filter 14 which can help to reduce the feeding time to open and close the valve by dissolving some chlorine flowing through the tablets and as well as helping to prevent damage from freezing inside the PVC pipe when weather conditions reach freezing point. Since usual CCH chlorine tablets have a pH level of eleven ('11'), it is normal to see an increase in the pH level in the pool water when the chlorine feeder 12 provides more chlorine. The increase in pH level will then be read and detected by the chemical controller 12. When the higher pH is detected, the chemical controller 12 sends another 120V signal to the acid pump 24 to feed muriatic acid (from the acid tank) to the pool water to lower the pH level to the set point.

In some embodiments, a gate relation between the zero differential solenoid valve 16 and the normally open solenoid valve 18 is used to signal the solenoid valve zero differential solenoid valve 16 to open and close. Specifically, when more chlorine needs to be delivered to the swimming pool, the chemical controller 10 will send a 120V signal to open the zero differential solenoid valve 16 and the same signal to close the normally open solenoid valve 18 to feed the water stream in one direction to the chlorine feeder 12. Also, for a big body pools, such as those pools which are capable of holding 15,000 gallons of water or more, it is preferable to send as much high flow as possible along the direction of the chlorine feeder 12 and close any other stream to harvest or dissolve more chlorine from the tablets. While normally open, the normally open solenoid valve 18 is on the mainstream (on the high pressure side) that washes, through ⅜ inch hose, the clear sediment filter 20 and is triggered to be closed at that moment. On the other hand, after the feeding time is done, the normally closed solenoid valve—the zero differential solenoid valve 16—will close and the other, normally open solenoid valve 18 will open to wash the sediment filter and break the undissolved particles.

Figure 2:
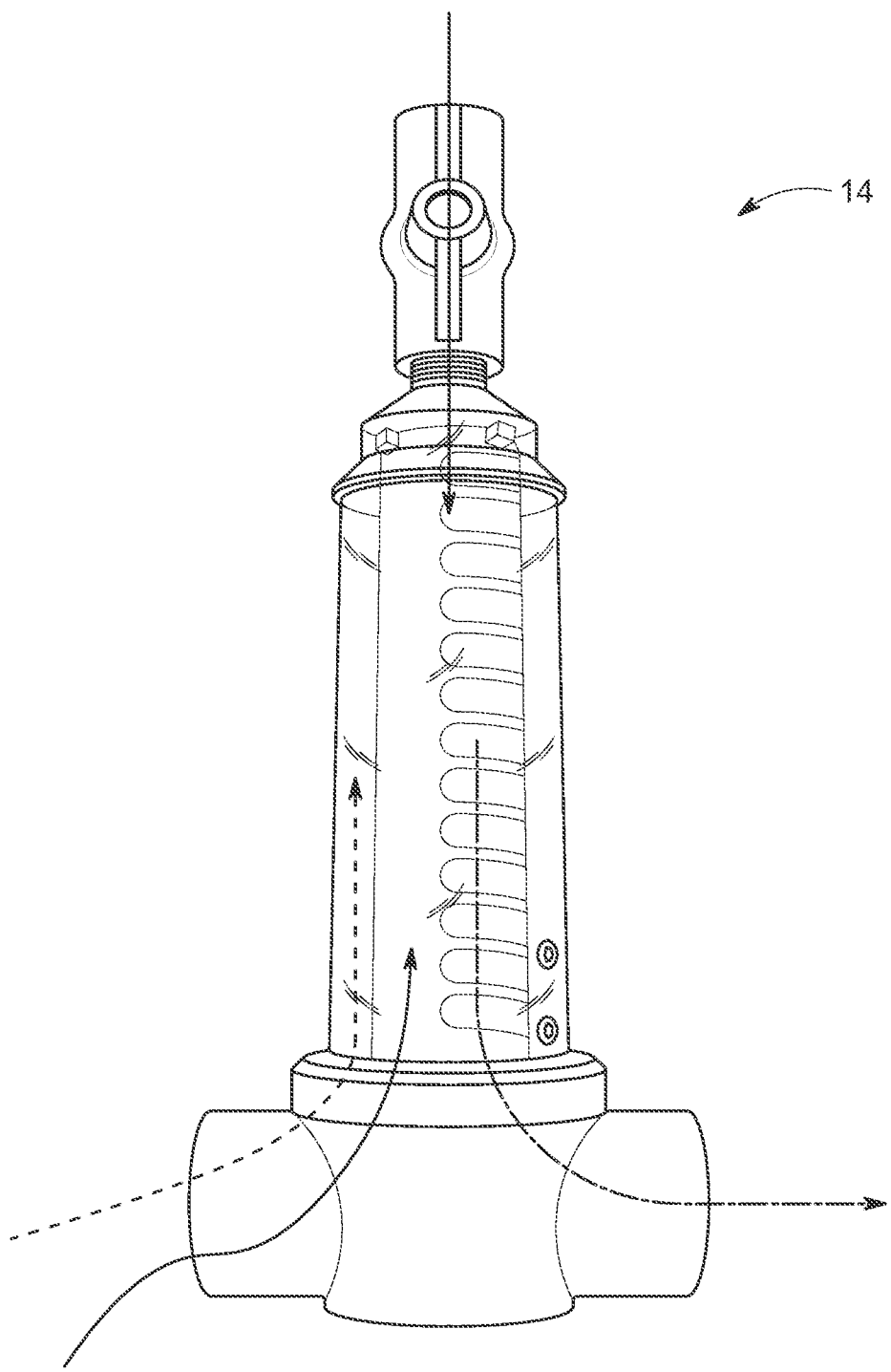
FIG. 2 conceptually illustrates direction of water flow through the spin-down sediment filter of the automated swimming pool chemical dispensing system in some embodiments.

By way of example, FIG. 2 conceptually illustrates direction of water flow through the spin-down sediment filter of the automated swimming pool chemical dispensing system in some embodiments. Specifically, the direction of water flow is shown in connection with the chemical resistant sediment screen T-style filter 14.

Figure 3:
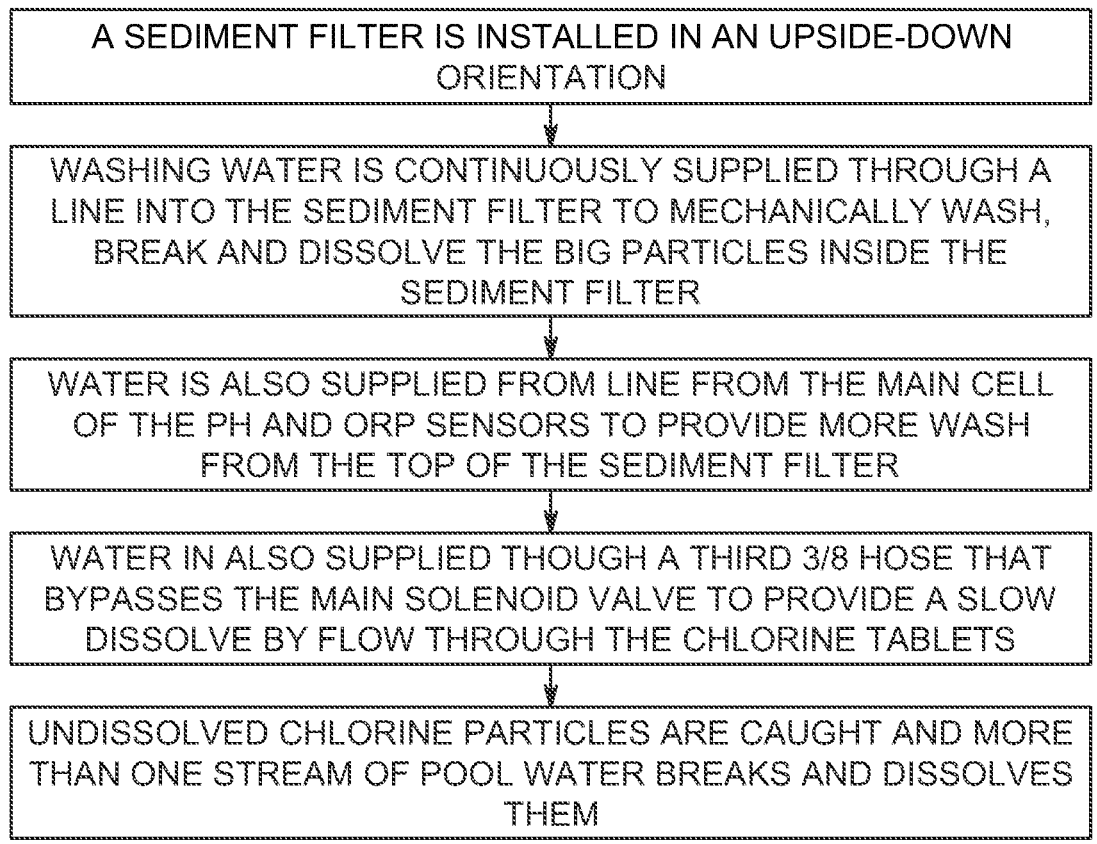
FIG. 3 conceptually illustrates a spin-down sediment filter washing water supply process for dissolving chlorine particles in some embodiments.

Now referring to FIG. 3, a spin-down sediment filter washing water supply process for dissolving chlorine particles is conceptually illustrated. As shown in this figure, the spin-down sediment filter washing water supply process for dissolving chlorine particles starts when (or after) a sediment filter 14 is installed in an upside-down orientation in an automated swimming pool chemical dispensing system. Next, the spin-down sediment filter washing water supply process for dissolving chlorine particles moves on to a step at which washing water is continuously supplied through a line into the sediment filter to mechanically wash, break down, and dissolve big chlorine particles inside the upside-down oriented sediment filter 14.

Referring back to the water flow shown in FIG. 2, this is demonstrated by the solid line arrow flowing from the left side into and up into the upside-down orientation of the sediment filter 14.

Turning back to FIG. 3, the spin-down sediment filter washing water supply process for dissolving chlorine particles moves to the next step at which water is also supplied from line from the main cell of the pH and ORP sensors to provide more wash from the top of the upside-down oriented sediment filter 14.

Again, referring back to the water flow shown in FIG. 2, this is demonstrated by the top-down solid line arrow starting at the top of the upside-down orientation of the sediment filter 14 and down into the filter.

Referring back to FIG. 3, the spin-down sediment filter washing water supply process for dissolving chlorine particles explains that water is also supplied through a third, ⅜ inch hose which bypasses the main solenoid valve to provide a slow dissolve by flowing water through the chlorine tablets.

This is demonstrated, again by reference back to FIG. 2, where the dashed line arrow from the left side illustrates the water flow through the ⅜ inch hose into the upside-down oriented sediment filter 14.

Finally, referring back to FIG. 3, the spin-down sediment filter washing water supply process ensures that undissolved particles of chlorine are caught and more than one stream of pool water breaks them apart and dissolves them.

While the spin-down sediment filter washing water supply process for dissolving chlorine particles described above, by reference to FIG. 3, demonstrates the underlying automation of controlling the water washing used to break apart and dissolve chlorine tablets, particles, and residue, another process is described next, by reference to FIG. 4.

Figure 4:
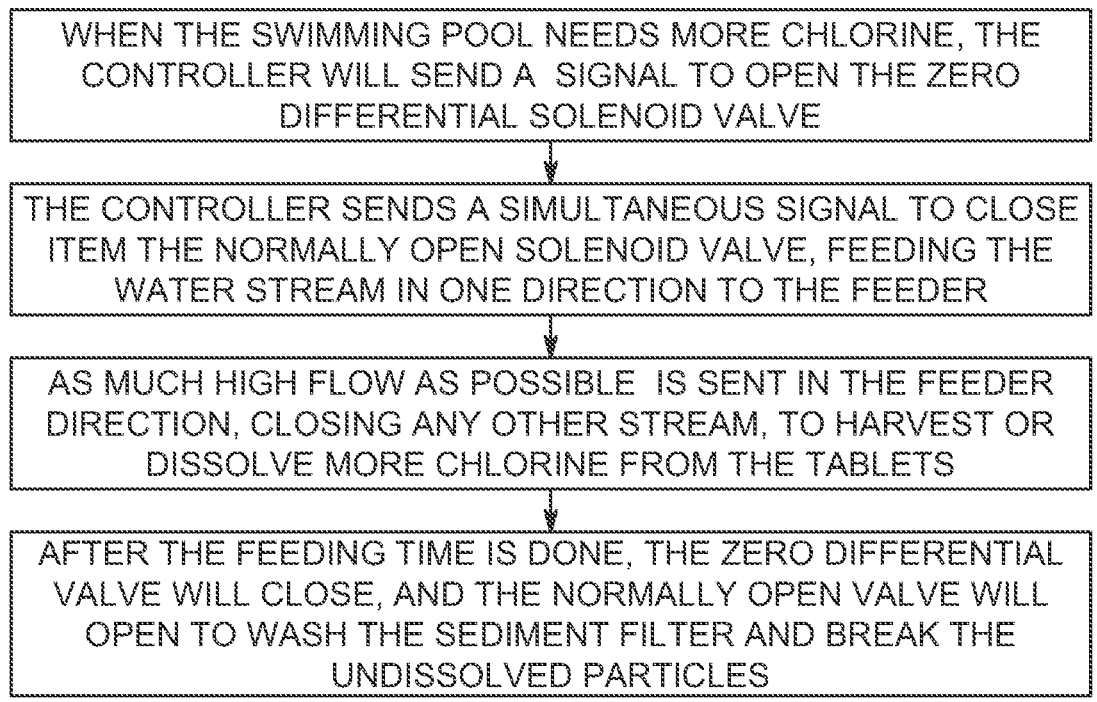
FIG. 4 conceptually illustrates an automated controller signal and valve control process for providing and dissolving chlorine when needed in the swimming pool in some embodiments.

Specifically, FIG. 4 conceptually illustrates an automated controller signal and valve control process for providing and dissolving chlorine when needed in the swimming pool in some embodiments. As shown in this figure, the automated controller signal and valve control process for providing and dissolving chlorine when needed in the swimming pool is automated by the chemical controller to figure out when the swimming pool is in need of more chlorine. Thus, the automated controller signal and valve control process for providing and dissolving chlorine when needed in the swimming pool starts by the chemical controller 10 sending an electrical signal to open the zero differential solenoid valve 16 when more chlorine is needed in the swimming pool.

Simultaneously, the automated controller signal and valve control process for providing and dissolving chlorine when needed in the swimming pool carries out a step at which the chemical controller sends a separate, simultaneous electrical signal to close the normally open solenoid valve 18, thus feeding the water stream in one direction to the chlorine feeder 12.

After the valves 16 and 18 are opened and closed, respectively, the automated controller signal and valve control process for providing and dissolving chlorine when needed in the swimming pool goes on to the next step when as much high flow as possible is sent into the chlorine feeder 12 direction, closing any other stream, in order to harvest or dissolve more chlorine particles or residue from the CCH tablets.

Finally, after feeding time is completed, the zero differential solenoid valve 16 is triggered by electrical signal from the chemical controller 10 to close. Simultaneously, the normally open solenoid valve 18 is triggered by electrical signal from the chemical controller 10 to open, which results in water washing into the sediment filter 14 to break up any remaining undissolved chlorine particles.

Figure 5:
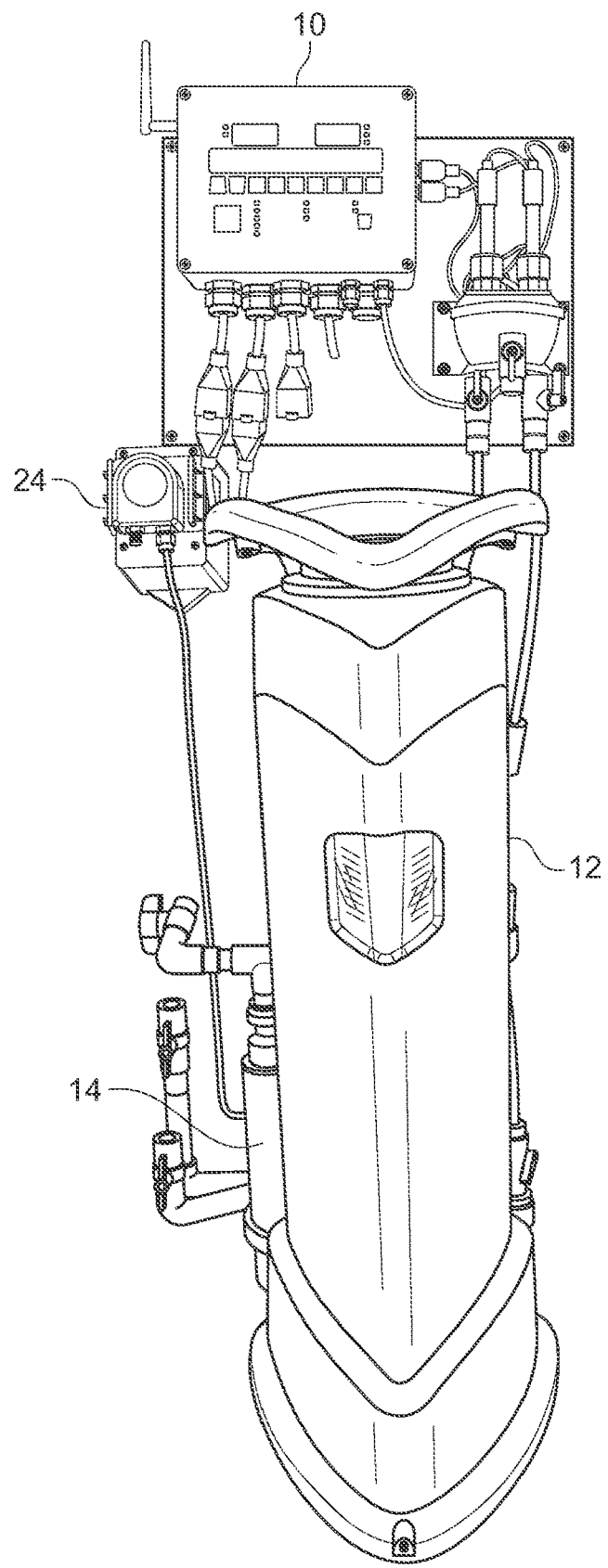
FIG. 5 conceptually illustrates a front view of an exemplary automated swimming pool chemical dispensing system with a spin-down sediment filter to control swimming pool chemistry in some embodiments.

In another view, FIG. 5 conceptually illustrates a front view of an exemplary automated swimming pool chemical dispensing system with a spin-down sediment filter to control swimming pool chemistry in some embodiments. As shown, the exemplary automated swimming pool chemical dispensing system with a spin-down sediment filter to control swimming pool chemistry includes the chemical controller 10, the chlorine feeder 12, the upside-down oriented chemical resistant sediment screen T-style filter 14, and the acid pump 24.

The front view of an exemplary automated swimming pool chemical dispensing system with a spin-down sediment filter to control swimming pool chemistry is presented for purposes of illustration and not of limitation. While some automated swimming pool chemical dispensing systems may be setup and deployed according to the exemplary front view shown in FIG. 5, many other arrangements of the components deployed for the system are possible, some of which depend on space considerations, others as a matter of design, efficiency in materials, etc. Thus, while embodiments of the invention have been described above with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. An automated swimming pool chemical dispensing system comprising:
   a chemical controller that is configured to automatically control swimming pool chemistry in a swimming pool water supply;
   a chlorine feeder that is configured to dispense chlorine tablets into a main water flow of the swimming pool water supply;
   a spin-down filter that is configured to dissolve chlorine tablets released by the chlorine feeder before the chlorine enters the swimming pool water supply;
   a normally closed solenoid valve;
   a normally open solenoid valve;
   a clear sediment filter along a main water flow to further wash chlorine through the spin-down filter from a water inlet opening;
   a waterproof cable connector that connects the chemical controller to the normally closed solenoid valve and the normally open solenoid valve; and
   an acid pump that is connected to an acid tank and is configured to feed acid to pool water when a pH level is detected at a high level by the chemical controller, wherein the spin-down filter comprises a chemical resistant sediment screen T-style spin-down filter and is installed in an upside-down orientation.

2. The automated swimming pool chemical dispensing system of claim 1, wherein the normally closed solenoid valve comprises a zero differential solenoid valve.

3. The automated swimming pool chemical dispensing system of claim 1, wherein the acid pump is configured to feed muriatic acid to the pool water to lower the pH level to a set point.

4. The automated swimming pool chemical dispensing system of claim 1, wherein the waterproof cable connector is configured for electrical signal flow from the chemical controller to the normally closed solenoid valve and the normally open solenoid valve.

5. The automated swimming pool chemical dispensing system of claim 4, wherein the chemical controller is configured to send electrical signals to the normally closed solenoid valve and the normally open solenoid valve over the waterproof cable connector to trigger the normally closed solenoid valve and the normally open solenoid valve to open and close to direct water flow.

6. The automated swimming pool chemical dispensing system of claim 1, wherein a plurality of water line hoses connect to the spin-down filter to provide water inlet and outflow to dissolve chlorine particles in the filter.

7. The automated swimming pool chemical dispensing system of claim 1, wherein the chemical controller is communicably connected to at least one pH sensor and at least one ORP sensor.

\* \* \* \* \*